(No Model.)

J. H. STEPHENS.
WEIGHING SCALE.

No. 573,367. Patented Dec. 15, 1896.

Witnesses
Geo. E. Frech
James W. Bevans

Inventor
John H. Stephens
By Pattison & Nesbit
Attorneys

UNITED STATES PATENT OFFICE.

JOHN H. STEPHENS, OF VERNON, TEXAS.

WEIGHING-SCALE.

SPECIFICATION forming part of Letters Patent No. 573,367, dated December 15, 1896.

Application filed December 19, 1895. Serial No. 572,629. (No model.)

*To all whom it may concern:*

Be it known that I, JOHN H. STEPHENS, of Vernon, in the county of Wilbarger and State of Texas, have invented certain new and useful Improvements in Weighing-Scales; and I do hereby declare the following to be a full, clear, and exact description of the invention, such as will enable others skilled in the art to which it pertains to make and use it, reference being had to the accompanying drawings, which form part of this specification.

This invention pertains to weighing-scales, the object being to provide a mechanism of simple and improved construction which will instantly determine and indicate the weight of the article placed thereon.

The invention consists of the novel features of construction hereinafter fully described and claimed, and illustrated by the accompanying drawings, in which—

Figure 1:
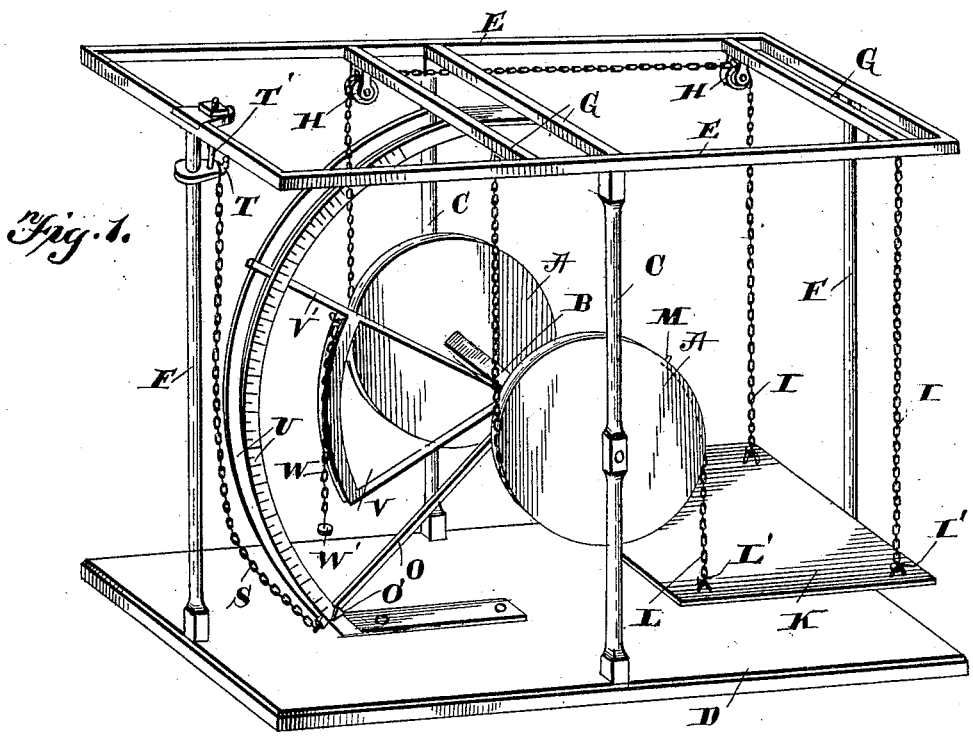
Figure 2:
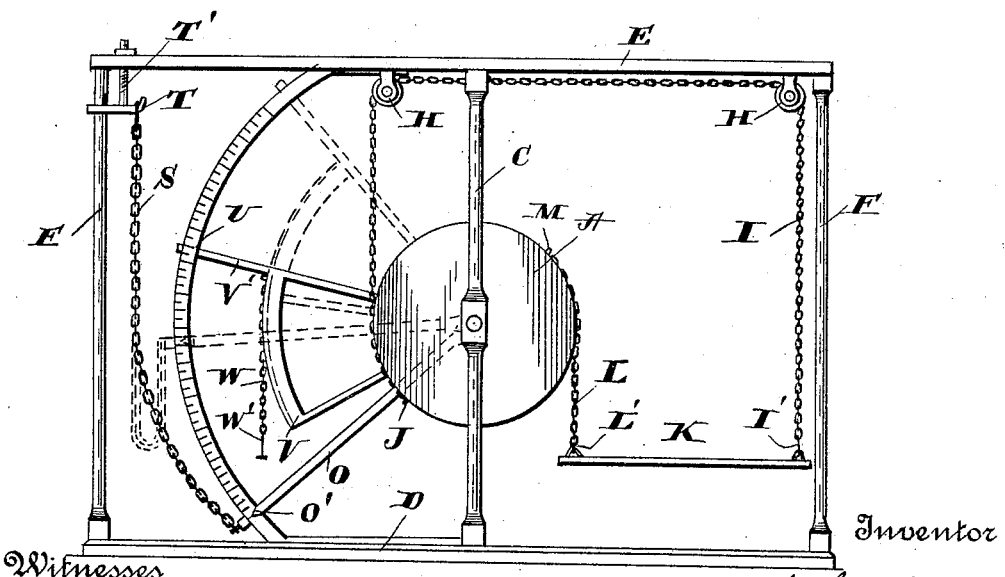

Figure 1 is a perspective view of a scale. Fig. 2 is a side elevation showing the position assumed by the same when weighing an article.

The peripherally-grooved disks A are mounted concentrically upon the transverse shaft B, which is supported in uprights C, standing in base D. The longitudinal top bars E of the framework are supported by posts C and F, and arranged on said bars E are the transverse pieces G, from which depend the pulleys H, two pulleys being carried by each cross-piece. The two chains I are arranged as shown, passing over said pulleys, with the corresponding extremities of each chain secured to the peripheries of disks A by hooks J, while the opposite extremities of said chains are secured by hooks I′ to the outer end of the weighing pan or platform K.
Short chains L depend from the disk peripheries, being attached thereto by hooks M, preferably arranged diametrically opposite hooks J and carrying at their lower ends hooks L′ for attaching to the inner side of platform K.
The chains extend vertically with the disks and hence run upon the grooved peripheries thereof.

Projecting outward from shaft B in the opposite direction from the weighing-pan is arm O, which turns with the shaft and hence raises and lowers in accord with the movement of the disks. Chain S at its upper end is secured to one of the posts F by the hook T, the latter being adjustable vertically on the post by the threaded rod T′. The lower end of the chain is secured to the outer extremity of arm O. Each link thereof is of predetermined weight, and as the chain-loop depends beneath the horizontal plane of the beam it will be understood that in raising to said plane or above it a number of the links will be depending from the beam and maintained thereby, and by including in the calculation the number of links thus sustained the weight of a given article is readily ascertained.

The outer end of beam O extends through the double segmental scale U, and chain S is of sufficient height to permit the beam to drop to the bottom of said scale, which is its normal position. If, however, for any reason it is desired to raise said normal position, the chain is elevated by rod T. Pointer O′, carried by the beam, moves over the scale, as shown.

A segment V is secured to shaft B over beam O, with the arm V′ thereof projected between the scale-segments as a guide and brace. From the segment depends chain W, with the usual holder W′ at its lower end for supporting slotted weights of ordinary form. Said weight-chain is no longer than the segment, so that the weights will always be sustained at the same distance from the axis of the weighing-disks.

It is my intention to construct scales of varied sizes in accordance with the plan herein described. Thus they may be of proper size for weighing groceries, meats, &c., or they may be in proper proportion for weighing wagons, teams, &c.

If desired, the platform or pan may be dispensed with and the chains I and L attached by their respective hooks to the wheels of the wagons or to other articles capable of suspension.

Having thus fully described my invention, what I claim, and desire to secure by Letters Patent, is—

1. The combination of revoluble disks, chains depending from the same to one side of the axis of the disks, a weighing-pan supported at one end by said chains, chains I secured to the other end of the weighing-pan and passed over suitably-arranged rollers to the side of the disks opposite the first-named chains and there secured and a weight-indicator actuated with the disks, substantially as shown and described.

2. The combination of revoluble disks, the weighing-pan sustained at one end by the disks at a point to one side of their axis, devices secured to the disks opposite the first-named sustaining devices and extended upward and over the disks and depending to support the other end of the pan and a weight-indicator actuated with the disks, substantially as shown and described.

3. The combination of revoluble disks, the weighing-pan, chains for sustaining one end of the pan which depend from the periphery of the disks, upwardly-extending chains secured to the periphery of the disks diametrically opposite the first-named chains, said second chains being extended over suitable guides for sustaining the other end of the pan and a weight-indicator actuated by the disks, substantially as shown and described.

4. The combination of the revoluble disks, the short chains secured to and depending over the peripheries of the disks, the weighing-pan sustained at one end by the lower extremities of said chains, the second pair of chains secured to the other end of the weighing-pan and extended upward over suitably-arranged rollers and then depending over the peripheries of the disks opposite the first-named chains and secured to said disks and a weight-indicator movable with the disks, substantially as shown and described.

5. The combination of a vibratory counterweight-support having horizontal axis, a weighing-pan arranged at one side thereof, chains L depending from the support to the pan, chains I extending upward from the support opposite depending chains L, an elevated way for chains I whereby they are adapted to depend over the pan and with chains L support the same and a weight-indicator movable with the counterweight-support, substantially as shown and described.

6. An improved scale comprising a framework, a shaft arranged horizontally therein, disks mounted concentrically on said shaft, weighing-pan K, short chains L depending from the disks upon one side and secured to the pan, and rollers H depending from elevated positions in the frame, the long chains I secured at their lower ends to the pan and extended upward to said rollers and downward therefrom and secured to the sides of the disks opposite the chain L, and a counterweight mechanism carried by the said shaft, substantially as shown and described.

7. The combination of the rotatable weighing-disks and axial shaft, the sustaining-chains secured to and leading from the disks as described, beam O, the double scale in which the beam moves, the segment V carried by the axial shaft, the arm extended from the segment to move in said double scale, and the weight-chain on the segment, substantially as shown and described.

In testimony whereof I affix my signature in presence of two witnesses.

JOHN H. STEPHENS.

Witnesses:
S. P. HUFF,
J. B. TOLBERT.